(12) United States Patent
Gros

(10) Patent No.: US 6,371,344 B1
(45) Date of Patent: Apr. 16, 2002

(54) HIGHWAY PRODUCTS TIRE CHAIN HANGER

(75) Inventor: Eugene W. Gros, 1380 W. Linn Rd., Eagle Point, OR (US) 97524

(73) Assignee: Eugene W. Gros, Eagle Point, OR (US)

( * ) Notice: Subject to any disclaimer, the term of this patent is extended or adjusted under 35 U.S.C. 154(b) by 0 days.

(21) Appl. No.: 09/675,814

(22) Filed: Sep. 27, 2000

(51) Int. Cl.⁷ .................................................. B60R 7/00
(52) U.S. Cl. ...................... 224/545; 224/401; 224/566; 220/324; 220/826; 220/835
(58) Field of Search ................................. 224/401, 404, 224/560, 561, 564, 565, 566, 539, 545; 220/324, 210, 826, 835, 908

(56) References Cited

U.S. PATENT DOCUMENTS

| | | | |
|---|---|---|---|
| 1,080,551 A | * | 12/1913 | Hartwell |
| 1,564,989 A | * | 12/1925 | Weisberger |
| 3,392,870 A | * | 7/1968 | Schulz |
| 4,143,695 A | * | 3/1979 | Hoehn |
| 5,316,191 A | * | 5/1994 | Gibson et al. |
| 5,419,476 A | * | 5/1995 | White |
| 6,170,723 B1 | * | 1/2001 | Howell .................. 224/404 |

OTHER PUBLICATIONS

Merritt Equipment Co.; no date given.*

Pro–Tech accessories form www.protech.net/tt/access.html; Oct. 30, 2000.*

* cited by examiner

Primary Examiner—Gregory M. Vidovich

(57) ABSTRACT

A device for holding tire chains which differs from the prior art in that it features double doors that open widely with only 5" of clearance above the chain hanger. Other chain hangers have only one door that requires a significant amount of clearance to open or a removable door that gets left behind or falls off if not properly secured.

7 Claims, 14 Drawing Sheets

HIGHWAY PRODUCTS TIRE CHAIN HANGER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Basically, the invention consists of a structure that is used to carry tire chains that are mounted on the frame of a motor vehicle or semi tractor. The main difference from other tire chain hangers is the way the doors open. The Highway Products Tire Chain Hanger features double doors that allow for convenient access to either side of the tire chain hanger. It needs only 5" of clearance above the chain hanger to open. The double doors fold open on top each other, moving completely out of the way to access the tire chains. Many trailers being pulled or flatbeds mounted on a truck will only allow a minimal amount of space to access items bolted to the frame of a truck such as a tire chain hanger. The standard chain hanger produced by other manufacturers has only one door that opens up in order to access the tire chains and requires a significant amount of clearance space in order to open the door. Before this invention drivers may not have been able to mount a chain hanger or may not have had full access to the tire chains in the hanger because of this limited clearance. Another standard chain hanger produced requires that the door be completely removed in order to access the tire chains; thus having the potential of being left behind or falling off during transit if not secured properly (Note that Pro-Tech's brochure also acknowledges this fact).

In accordance with my statutory duty of disclosure, brochures depicting tire chain hangers presently being made and sold are enclosed. Also enclosed are fourteen black line drawings of the Highway Products Tire Chain Hanger containing all possible views.

BRIEF SUMMARY OF THE INVENTION

As mentioned earlier the Highway Products Tire Chain Hanger mounts onto the frame of a motor vehicle and is used to carry tire chains that may be needed in severe weather conditions. The Highway Products Tire Chain Hanger features unique double doors that need only 5" of clearance to open leaving both sides of the chain hanger easily accessible.

DETAILED DESCRIPTION OF THE INVENTION

For the purpose of promoting an understanding of the principles of the invention reference will now be made to the drawings and specific language will be used to describe the same. It will, nevertheless, be understood that no limitation of the scope of the invention is thereby intended.

Figure 1:
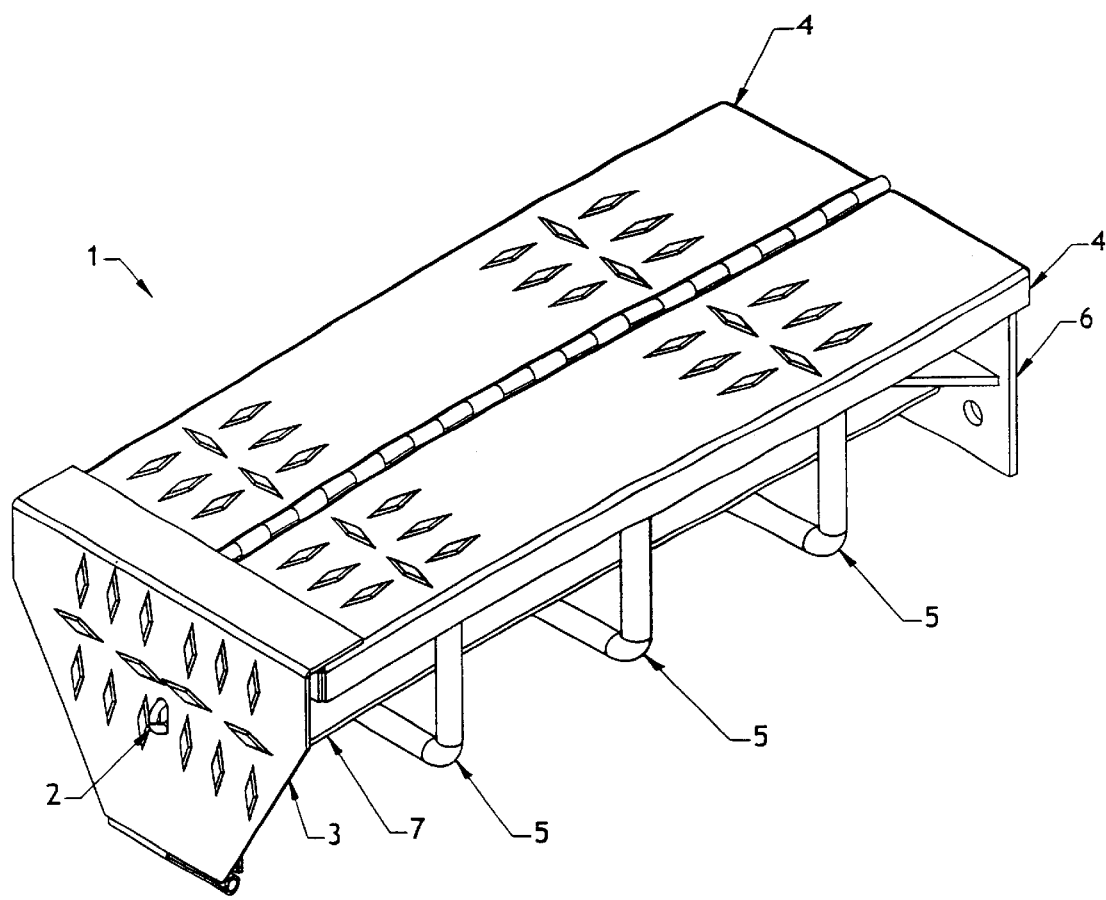
FIG. 1—Is a perspective view of the Highway Products Chain Hanger with the doors closed.

The Highway Products Tire Chain Hanger 1 of the present invention is for mounting on the frame of a motor vehicle (not shown) to hang and secure tire chains onto. Referring initially to FIG. 1, Highway Products Tire Chain Hanger 1 is illustrated showing the doors closed. The Highway Products Tire Chain Hanger 1 includes: a steel staple 2 used to attach a pad lock onto, front drop down door 3 used to secure the double doors 4, double doors 4 used for ease of accessing and securing tire chains, steel rod 5 used to hang the tire chains on, steel mount plate 6, and steel support tube and frame 7.

Figure 2:
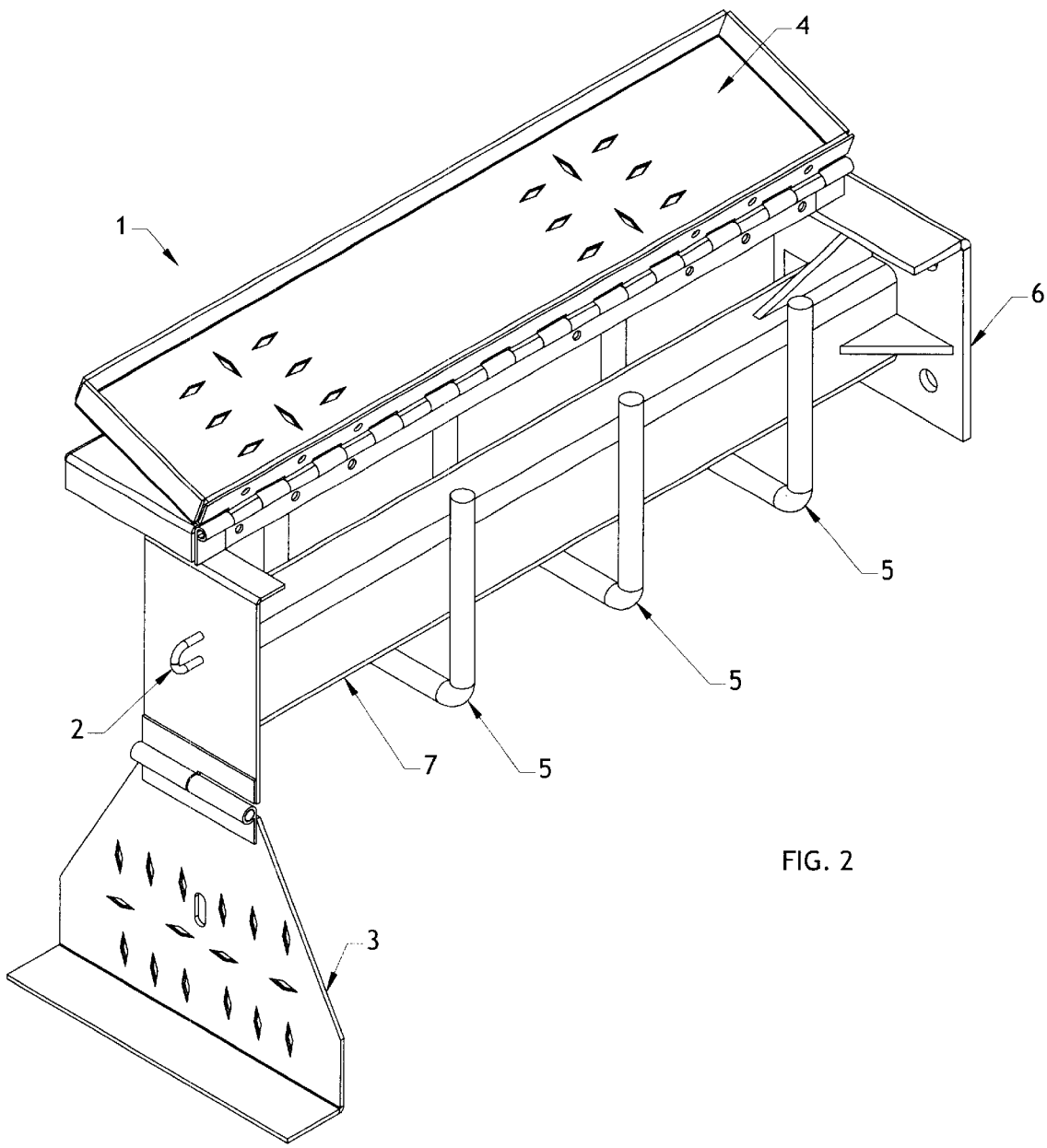
FIG. 2—Is a perspective view of the Highway Products Chain Hanger with the doors open.
Figure 3:
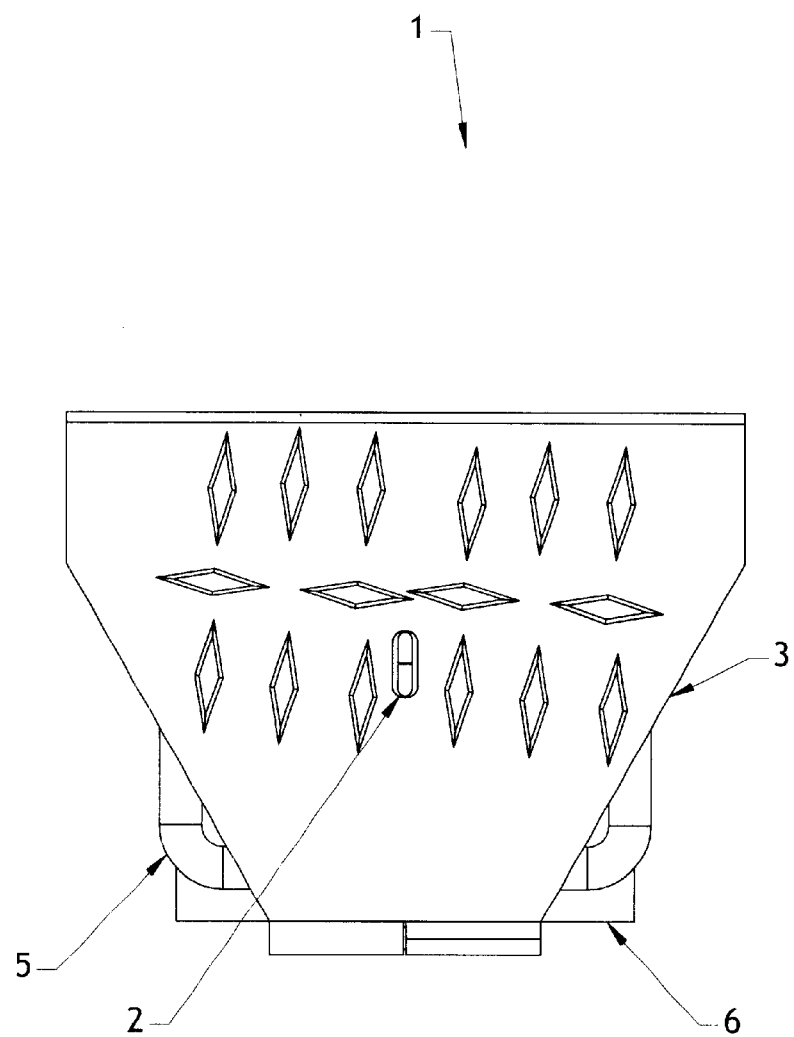
FIG. 3—Is a front elevation view of the Highway Products Chain Hanger with the doors closed.
Figure 4:
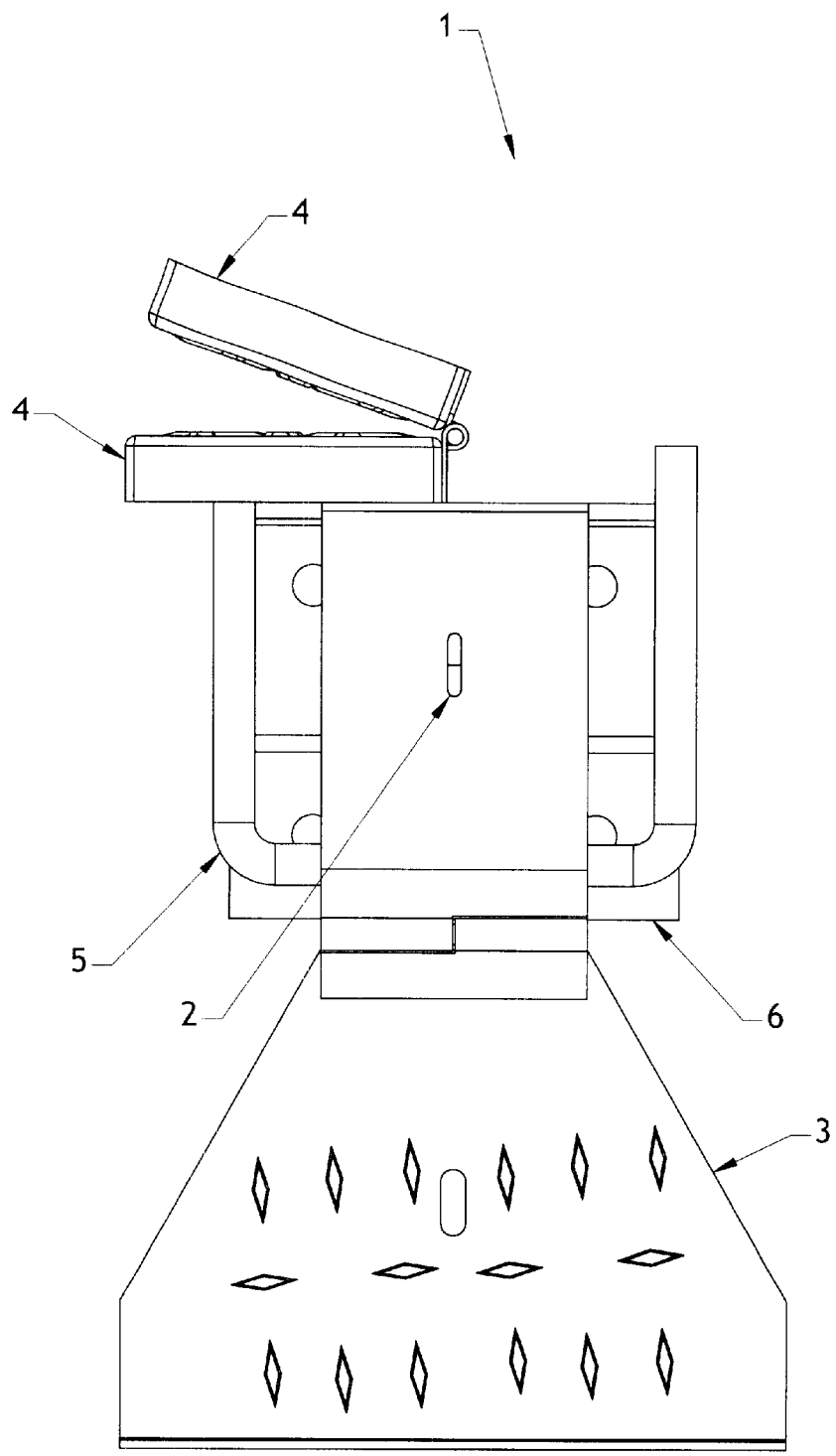
FIG. 4—Is a front elevation view of Highway Products Chain Hanger with the doors open.
Figure 5:
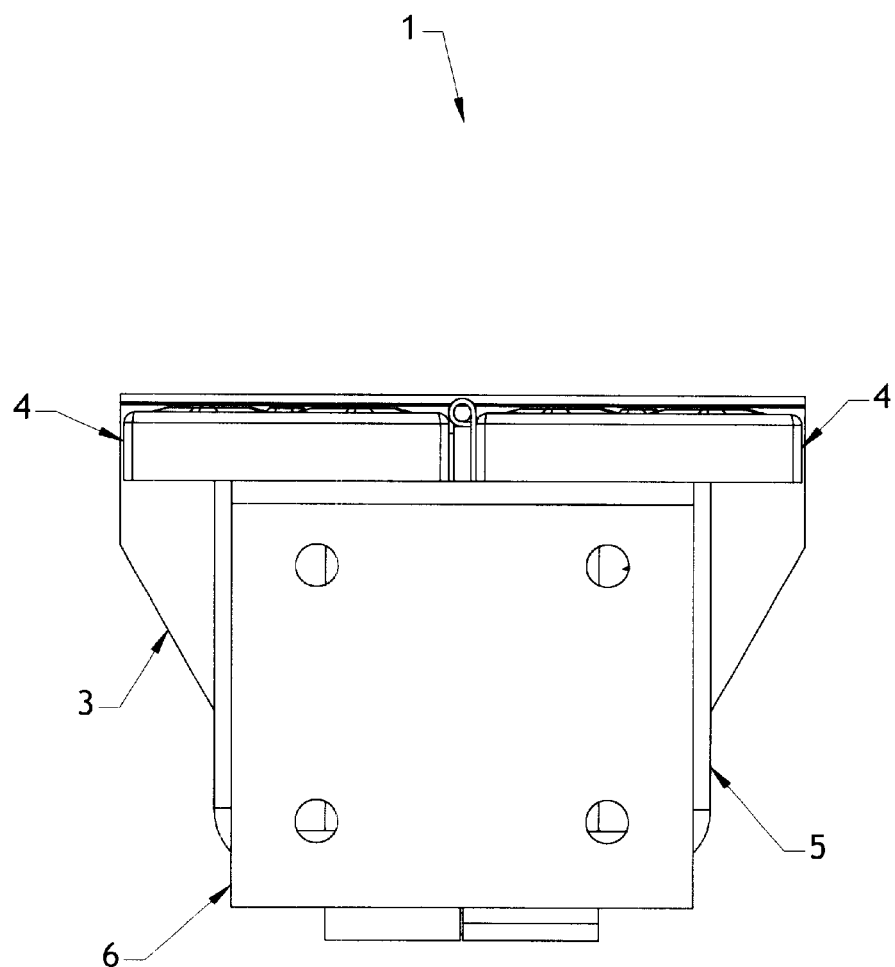
FIG. 5—Is a back elevation view of the Highway Products Chain Hanger with the doors closed.
Figure 6:
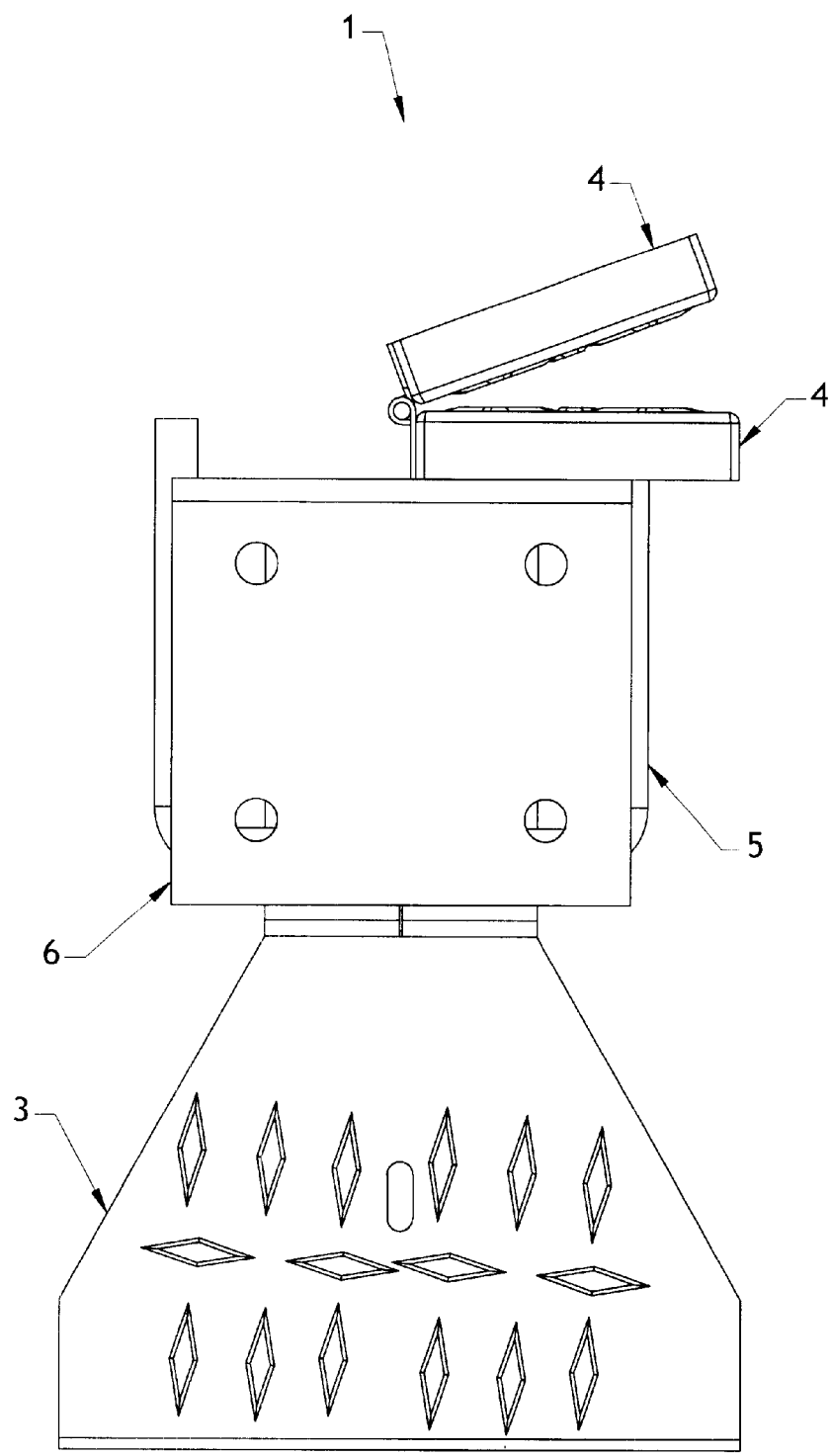
FIG. 6—Is a back elevation view of the Highway Products Chain Hanger with the doors open.

FIG. 2 illustrates the Highway Products Tire Chain Hanger 1 with the double doors 4 and the front drop down door 3 open. With all the doors open the driver has easy access to the tire chains and needs only 5" of clearance above the chain hanger to open the doors. When the doors are open as shown in FIG. 2 the mounting rods 5 are easily accessible.

Figure 7:
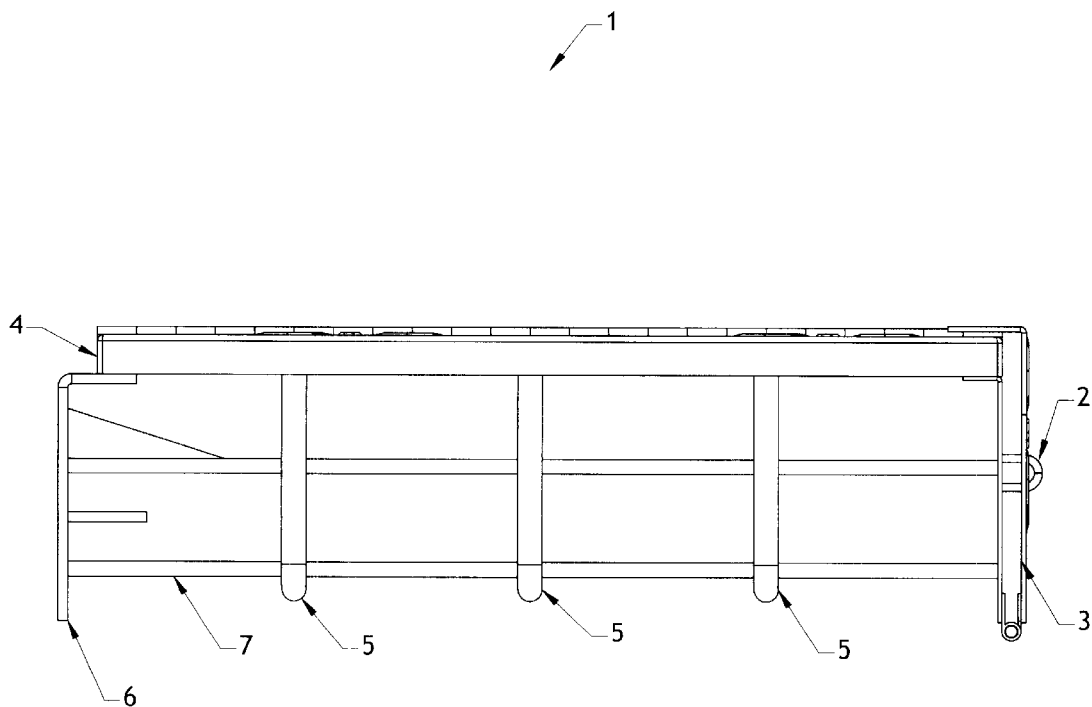
FIG. 7—Is a left side elevation view of the Highway Products Chain Hanger with the doors closed.
Figure 8:
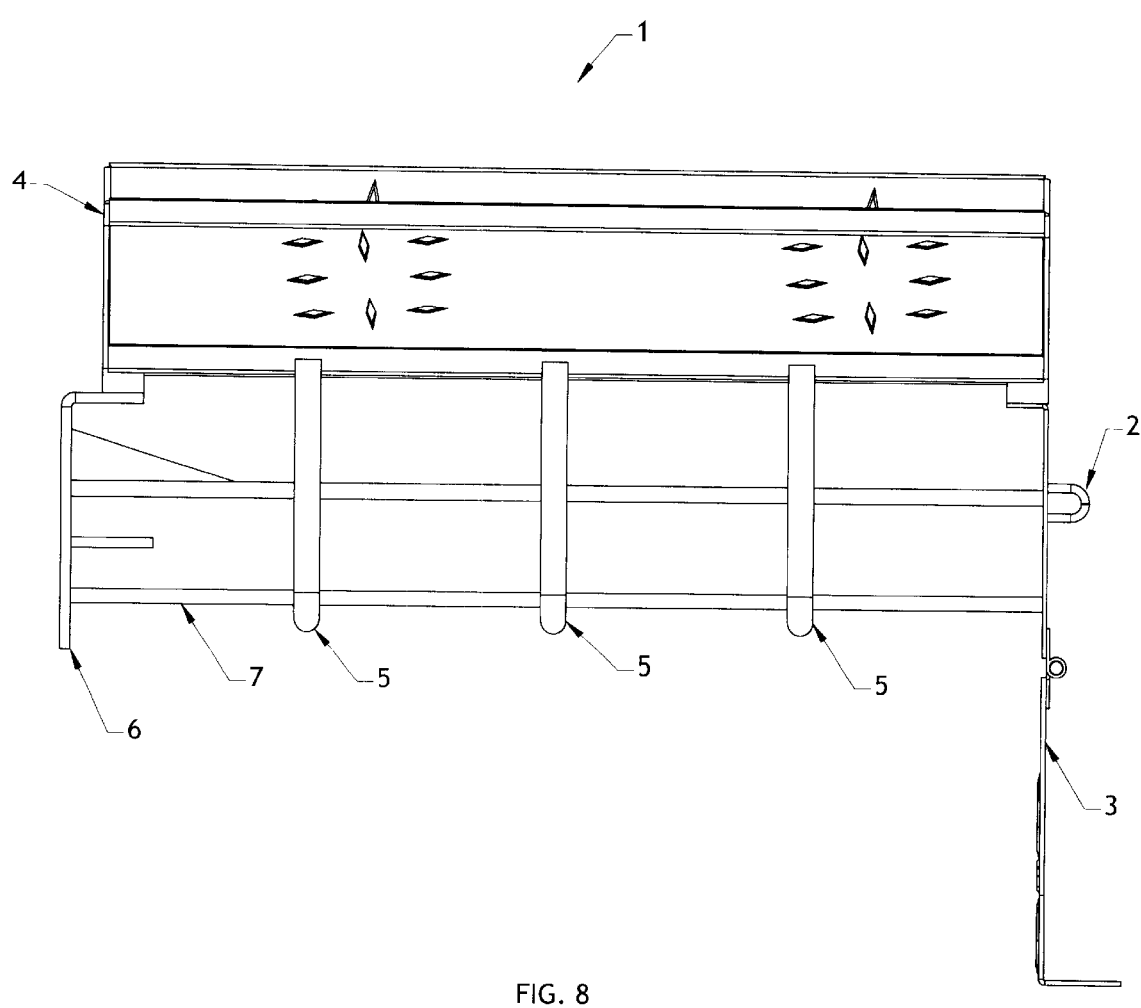
FIG. 8—Is a left side elevation view of the Highway Products Chain Hanger with the doors open.
Figure 9:
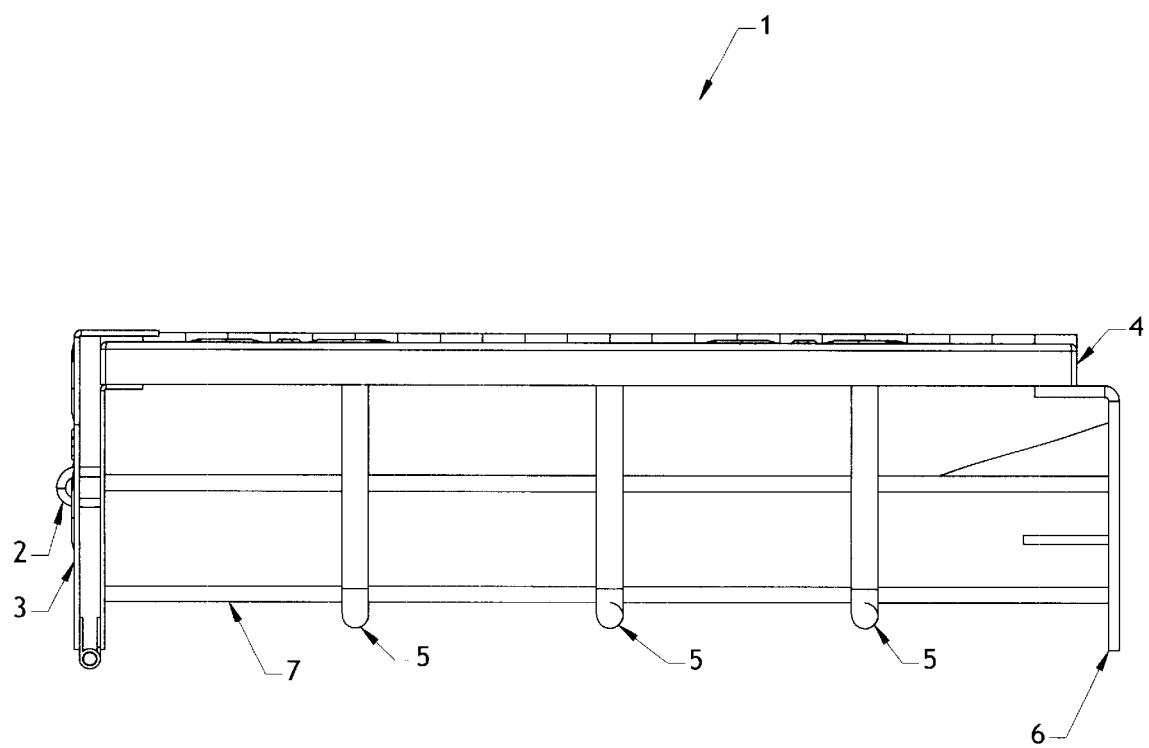
FIG. 9—Is a right side elevation view of the Highway Products Chain Hanger with the doors closed.
Figure 10:
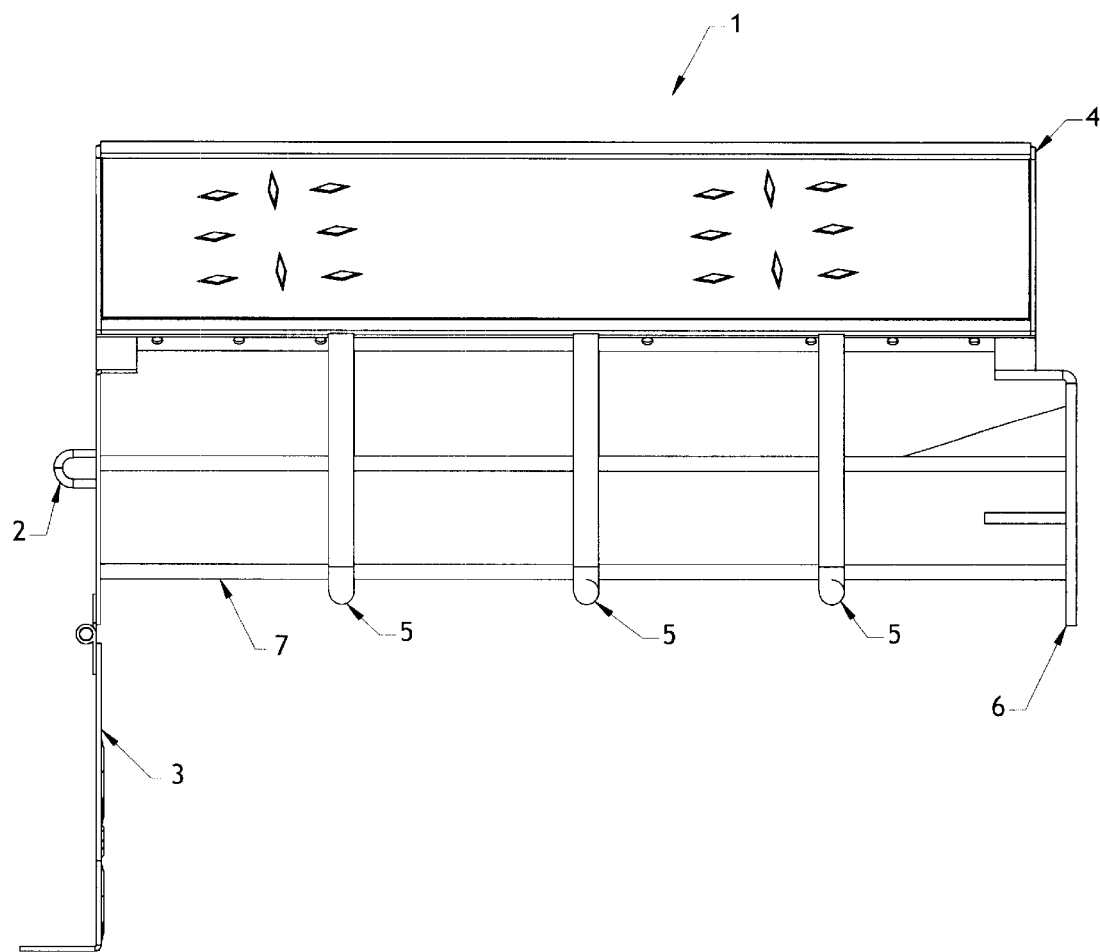
FIG. 10—Is a right side elevation view of the Highway Products Chain Hanger with the doors open.
Figure 11:
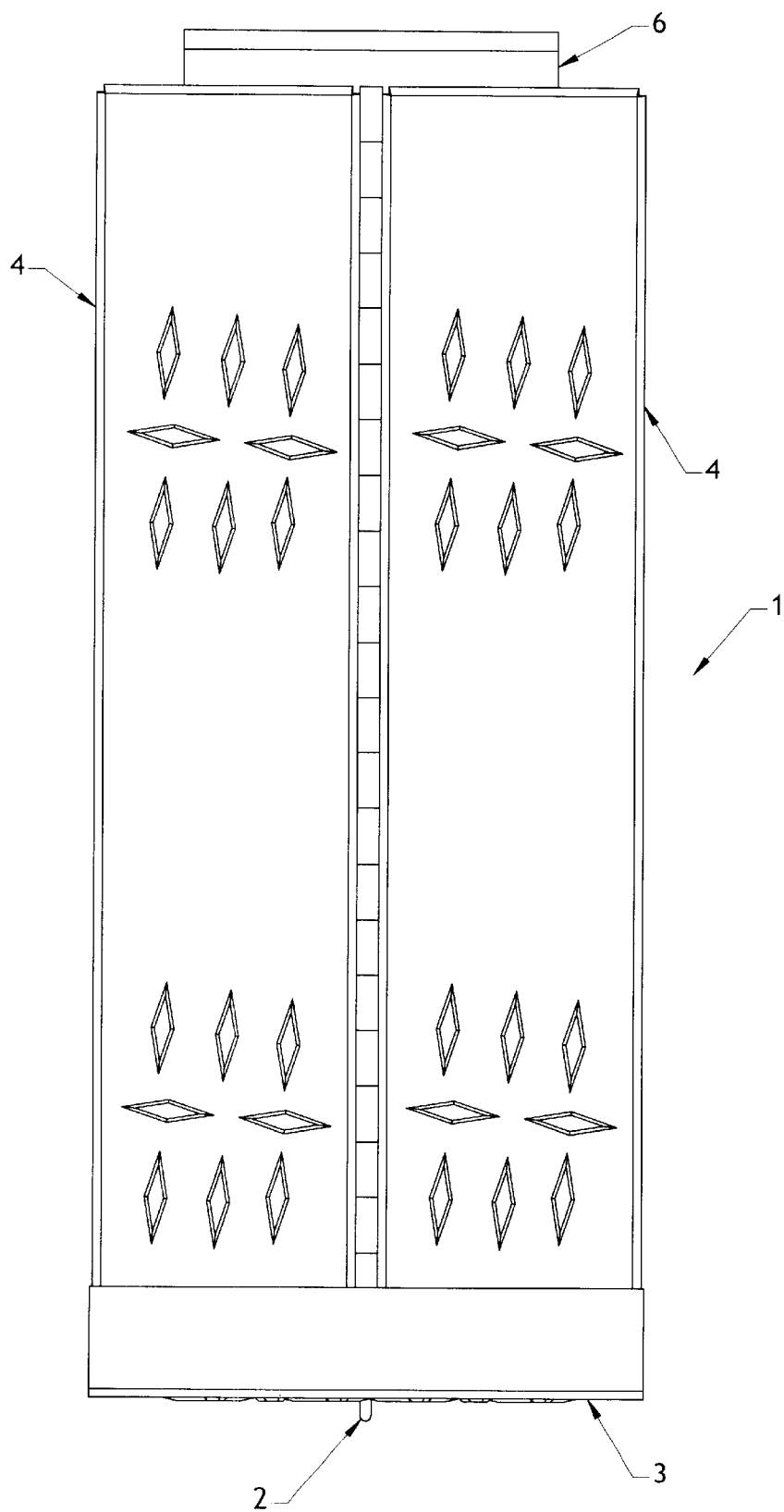
FIG. 11—Is a top plan view of the Highway Products Chain Hanger with the doors closed.
Figure 12:
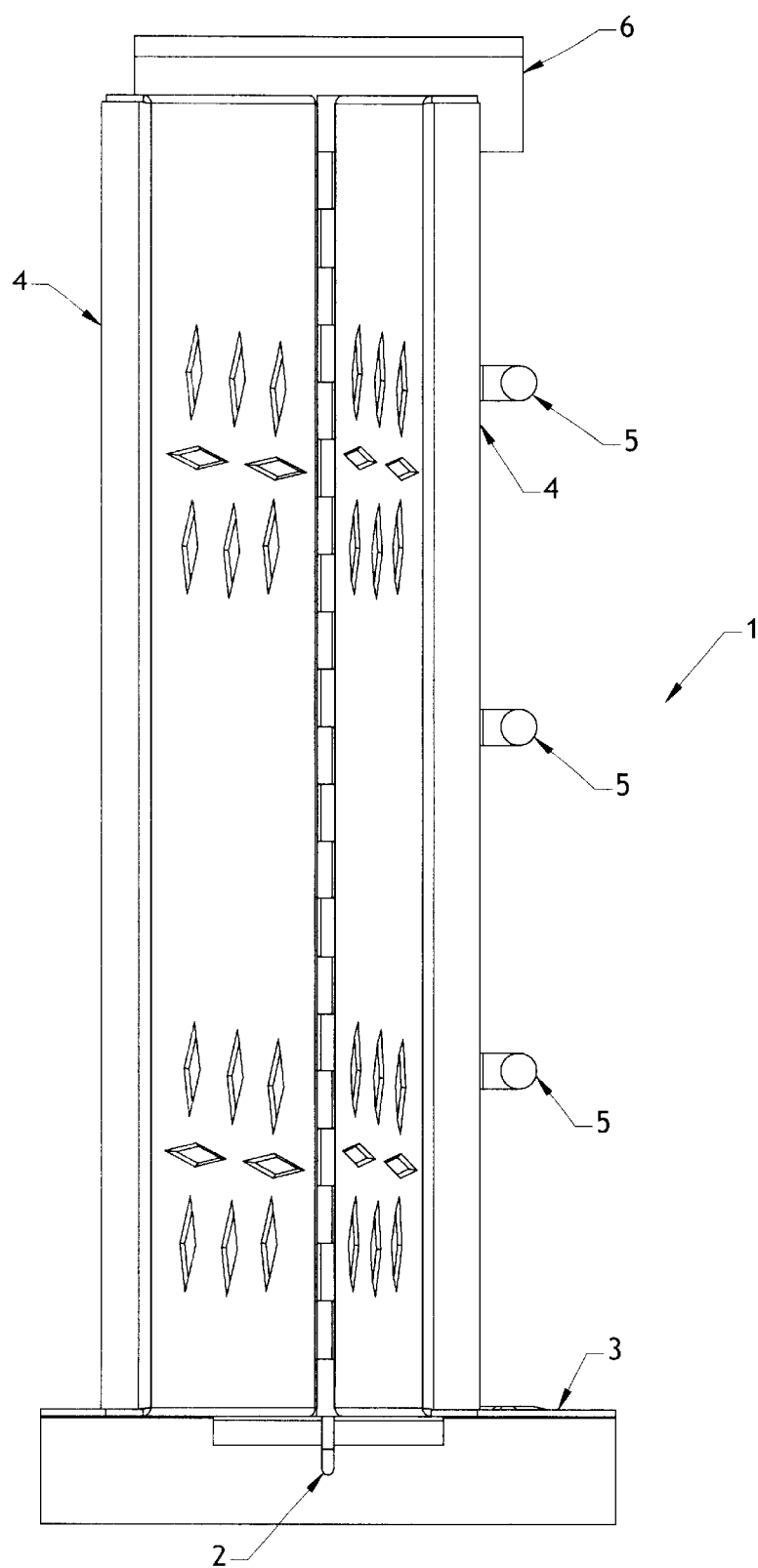
FIG. 12—Is a top plan view of the Highway Products Chain Hanger with the doors open.
Figure 13:
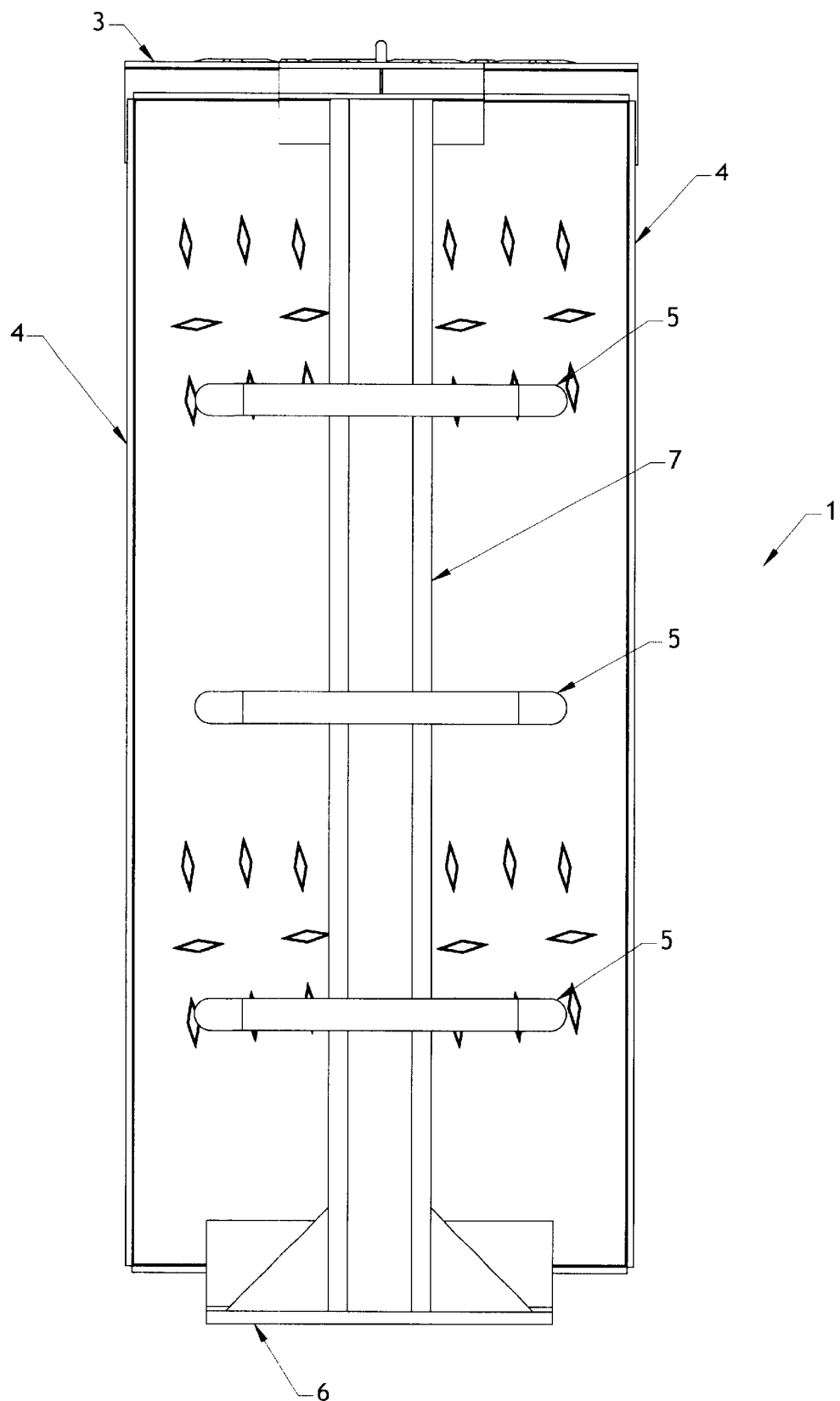
FIG. 13—Is a bottom plan view of the Highway Products Chain Hanger with the doors closed.
Figure 14:
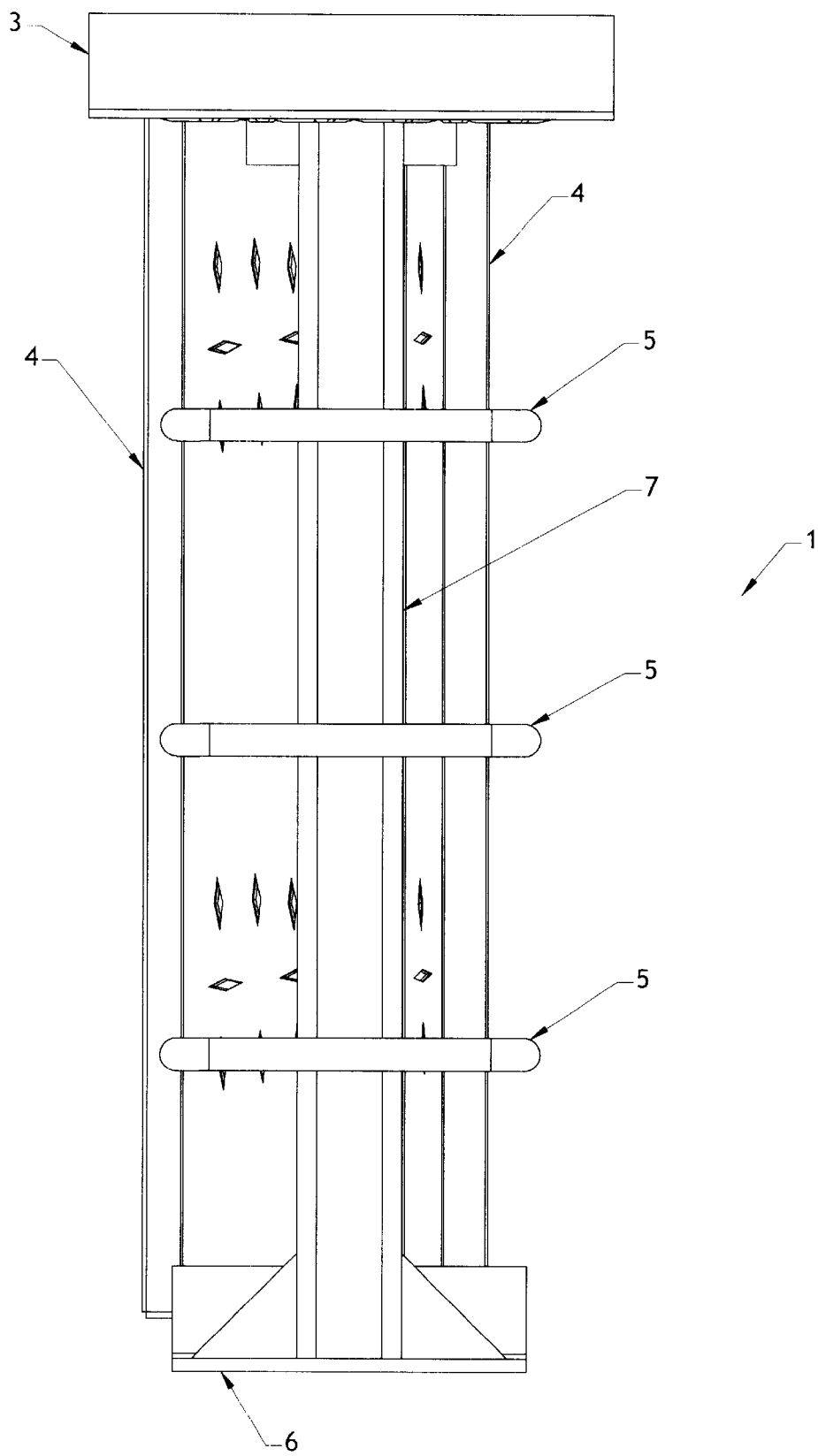
FIG. 14—Is a bottom plan view of the Highway Products Chain Hanger with the doors open.

FIG. 7 shows the support tube and frame 7 that is attached to the steel mount plate 6 using gussets. The double doors 4 and the front drop door 3 are attached using a stainless steel hinge. The Highway Products Tire Chain Hanger is constructed from both steel and aluminum. Diamond plate aluminum is used for the double doors 4 and the front drop down door 3. Steel is used for the support tube and frame 7 mount plate 6 and steel rod 5.

While the invention has been illustrated and described in detail in the drawings and description it is not restrictive in character. It being understood that all changes and modifications that come within the spirit of the invention are desired to be protected.

What I, Eugene W.Gros, claim as my invention is:

1. A tire chain hanger comprising:
   a frame having first and second ends defining an axis extending between said ends;
   at least one steel rod attached to said frame between said ends for hanging tire chains therefrom;
   a mount plate affixed to one of said ends of said frame, said mount plate adapted to mount the tire chain hanger to the frame of a motor vehicle;

a staple plate secured to other one of said ends of said frame, said staple plate having a staple secured thereto;

a drop down door pivotally coupled to said staple plate beneath said staple; and a pair of top doors, each of said doors extending between and pivotally connected with said mount plate and said staple plate along said axis such that said doors overlie said frame and said at least one steel rod, each said door being pivotally movable toward the other of said doors;

wherein said doors being pivotal to an open position to gain access to said at least one steel rod and being pivotal to a closed position to block access to said at least one steel rod, wherein said drop down door is pivoted to engage said top doors in said closed position to block movement of said top doors from said closed position to said open position and to cooperate with said staple whereby a locking device may be connected to said staple to prevent movement of said drop down door.

2. The tire chain hangar of claim 1 wherein the hangar needs only five inches of clearance space to open said top doors to gain access to said tire chains.

3. The tire claim hanger of claim, 1 wherein said at least one steel rod comprises three steel rods.

4. The tire chain hanger of claim 1 wherein said staple cooperates with said drop down door via an opening in said drop down door in which said staple extends therethrough.

5. The tire chain hanger of claim 1 wherein said top doors are formed from diamond plate aluminum.

6. The tire chain hanger of claim 1 wherein said at least one steel rod being substantially U-shaped.

7. The tire chain hanger of claim 1 wherein said drop down door includes a lip at a free end thereof which engages upper surfaces of said top doors when said drop down door is pivoted to block movement of said top doors.

* * * * *